C. VOGT.
DRINK MIXER.
APPLICATION FILED MAY 20, 1921.

1,402,813.

Patented Jan. 10, 1922.
3 SHEETS—SHEET 1.

INVENTOR
C. Vogt
BY
ATTORNEYS

C. VOGT.
DRINK MIXER.
APPLICATION FILED MAY 20, 1921.

1,402,813.

Patented Jan. 10, 1922.
3 SHEETS—SHEET 2.

INVENTOR
C. Vogt
BY Munn &Co
ATTORNEYS

C. VOGT.
DRINK MIXER.
APPLICATION FILED MAY 20, 1921.

1,402,813.

Patented Jan. 10, 1922.
3 SHEETS—SHEET 3.

INVENTOR
C. Vogt
BY Munn & Co.
ATTORNEYS

UNITED STATES PATENT OFFICE.

CHARLES VOGT, OF CHICAGO, ILLINOIS.

DRINK MIXER.

1,402,813. Specification of Letters Patent. Patented Jan. 10, 1922.

Application filed May 20, 1921. Serial No. 471,030.

*To all whom it may concern:*

Be it known that I, CHARLES VOGT, a citizen of the United States, and a resident of Chicago, in the county of Cook and State of Illinois, have invented a new and useful Improvement in Drink Mixers, of which the following is a full, clear, and exact description.

My invention relates to mechanical drink mixing devices, and it consists in the combinations, constructions, and arrangements herein described and claimed.

An object of my invention is to provide an improvement over the device disclosed in Letters Patent No. 1,323,506 issued to me Dec. 2, 1919, such improvement consisting in the provision of a novel means for controlling the means for actuating a drink agitating element embodied in the device.

A further object of my invention is to provide a drink mixer adapted to be actuated by water power and provided with means arranged to be operated automatically to control the flow of water into engagement with a movable part of the device.

A further object of my invention is to provide a device of the character described in which a rotatable and slidable rod carrying an agitator is actuated by a water motor to descend into a receptacle and to produce an agitation of the contents of the latter.

A further object of my invention is to provide a device of the character described in which a governor device is disposed between a water motor and a rotatable and slidable rod carrying an agitator, such governor device being arranged to include adjustable tensional means, whereby the governor may be arranged to be actuated at various speeds.

A further object of my invention is to provide a device of the character described in which a water motor for driving an agitator has a water conduit leading thereto and automatic means for controlling the flow of water through the conduit to the motor.

Other objects and advantages will appear in the following specification, and the novel features of the invention will be particularly pointed out in the appended claims.

My invention is illustrated in the accompanying drawings, forming part of this application, in which—

Figure 1:
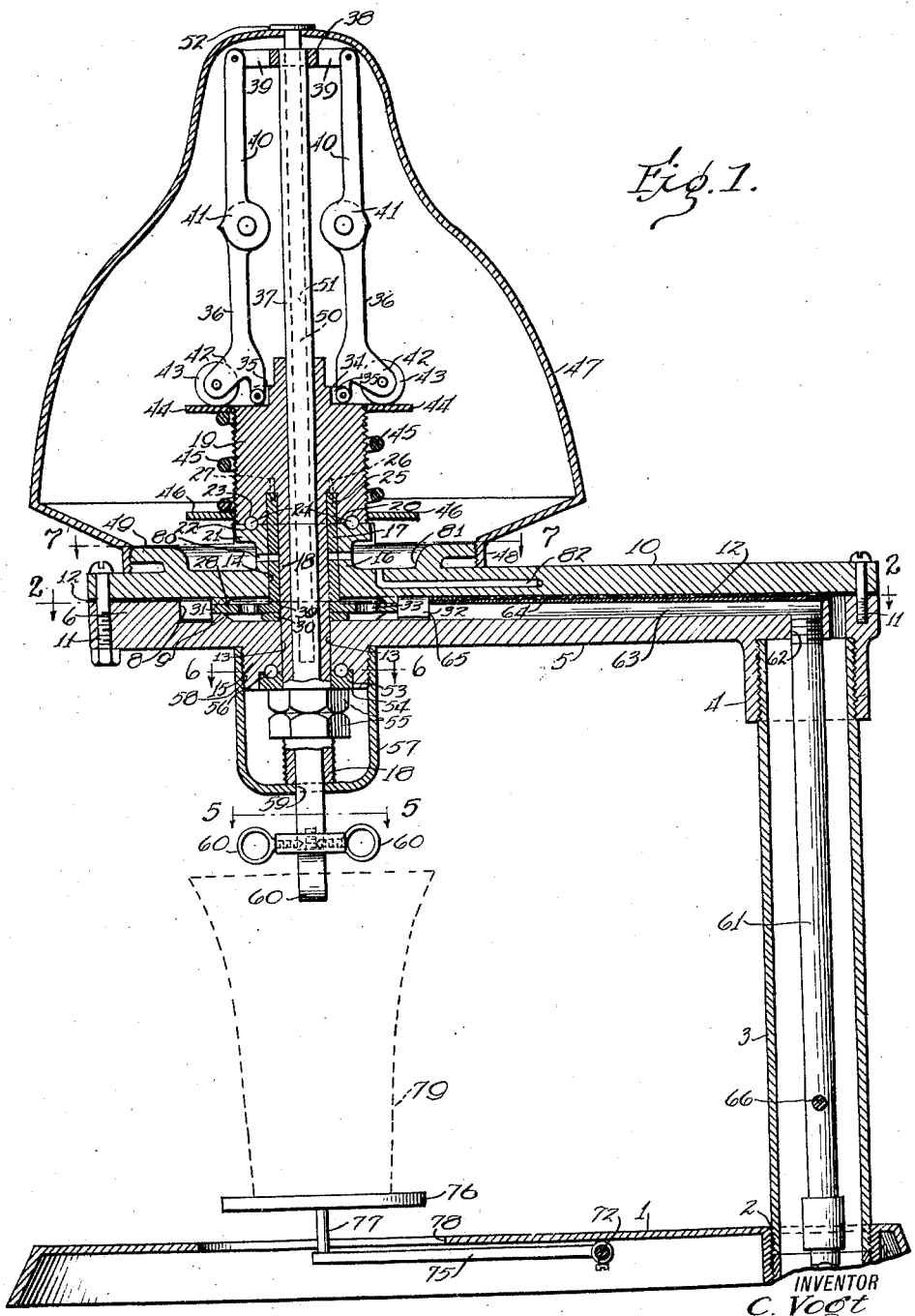
Figure 2:
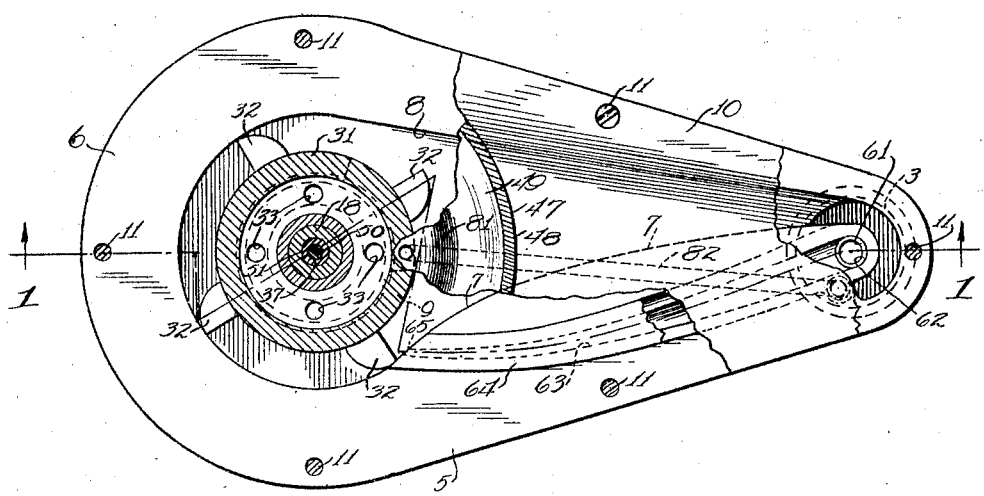
Figure 3:
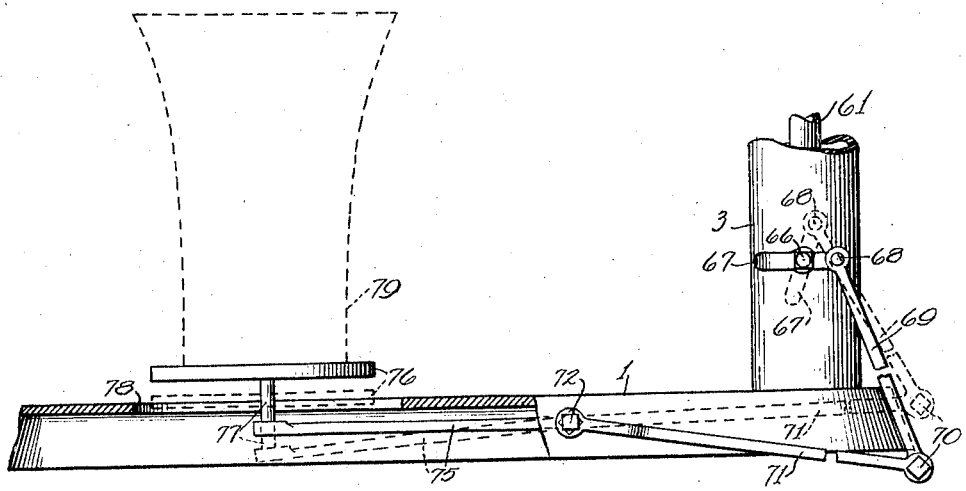
Figure 4:
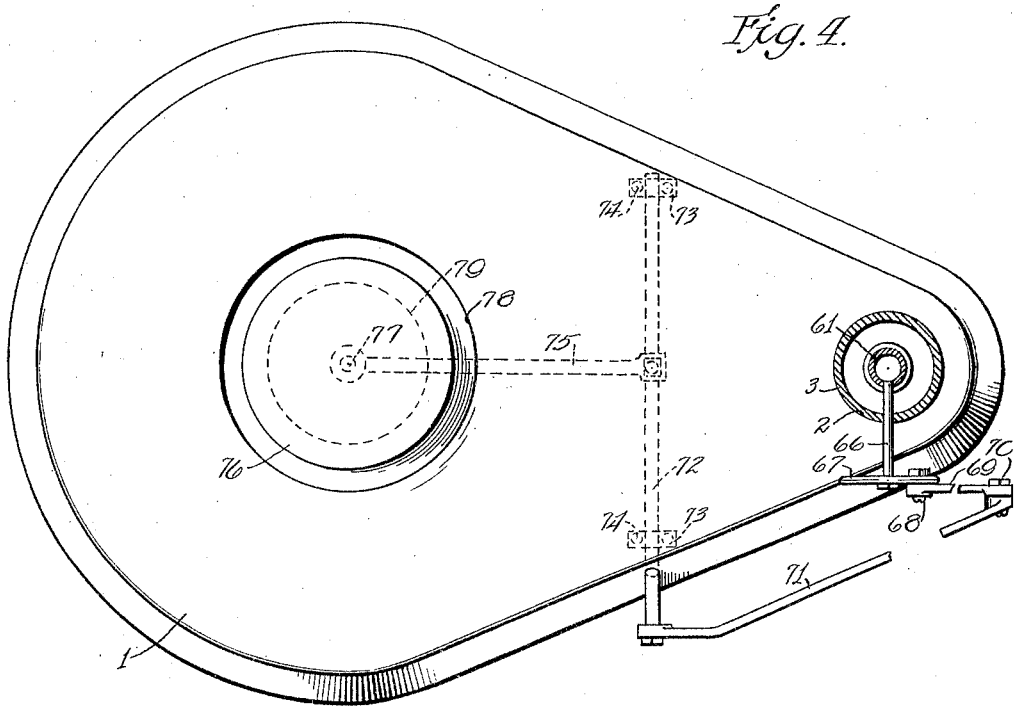
Figure 5:
Figure 7:
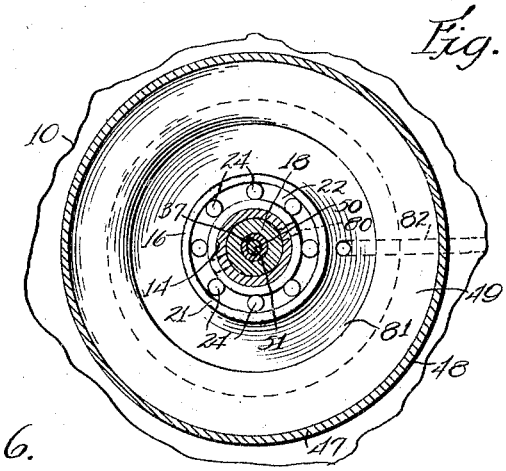
Figure 6:
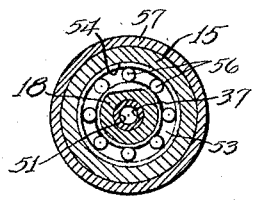

Fig. 1 is a vertical section through the device substantially along the line 1—1 of Fig. 2, portions thereof being shown in elevation, Fig. 2 is a section along the line 2—2 of Fig. 1, portions thereof being shown broken away, Figures 3 and 4, are, respectively, a side elevation and plan view of a portion of the device, and Figures 5, 6 and 7 are sections along the lines 5—5, 6—6 and 7—7, respectively, of Fig. 1.

In carrying out my invention, I provide a hollow base 1. The base 1, which is formed of any suitable material, is fashioned with an opening 2 through which a vertical pipe 3 extends. The pipe 3 is threaded at its upper end for engagement with a socket 4 integral with a casing 5, whereby the latter is supported by the pipe 3, as shown.

The casing 5 is formed with a continuous integral side wall 6 having an inward extension or enlargement 7 at one side, as best seen in Fig. 2, to define a chamber 8 that has an arcuate wall at one end, and side walls converging toward the opposite end, at which end the chamber communicates with the open upper end of the pipe 3. Concentric with the arcuate portion of the inner wall of the chamber 8, is an upstanding arcuate rib 9. A cover plate 10 is provided for the casing 5 and is secured thereon by bolts 11 or the like. A gasket 12 is interposed between the casing 5 and the cover plate 10 to insure a water tight connection between these parts. The casing 5 and the cover plate 10 are formed with vertically aligned openings 13 and 14 opening through oppositely extending integral bosses 15 and 16, respectively. The opening 14 is somewhat larger in diameter than the opening 13 so that a sleeve 17 mounted on a hollow shaft 18 passing through both openings and fitting the wall of the opening 13 closely, projects through the opening 14 and spaces the hollow shaft 18 from the wall of the latter. The hollow shaft 18 is enlarged at 19 to define a shoulder 20 resting upon a flange 21 integral with the boss 16, whereby the hollow shaft 18 depends below the casing 5. The flange 21 and the enlargement 19 are provided with cooperating grooves 22 and 23 in their contiguous surfaces in which work balls 24 so that the hollow shaft 18 turns anti-frictionally with respect to its bearing on the boss 16. The upper end portion of the sleeve 17 is arranged to enter an annular slot 25 in the shoulder 20 and carries pins or projections 26 adapted to enter sockets 27 in the upper wall of the slot 25 so that the hollow shaft 18 and the sleeve 17 rotate as a unit.

The sleeve 17 is integral with a disk 28 having a central opening 39 therethrough coinciding with the inner bore of the sleeve, and arranged to rest upon a ring 30 that rests upon the bottom of the chamber 8. The disk 28 constitutes the rotor of the device and has a slidable contact adjacent to its periphery with the rib 9 and an annular rib 31 that is integral with the cover 10. The disk 28 has a plurality of integral radial blades 32 that are fashioned as shown and extend beyond its periphery to abut the arcuate portion of the inner wall of the chamber 8 and is also formed with a plurality of openings 33 therethrough.

The enlarged portion 19 of the hollow shaft is reduced at 34 and provided with diametrically opposed lugs 35—35 to which are pivoted links 36—36. A rotatable and slidable vertical shaft 37 is projected through the bore of the hollow shaft 18 and depends below the lower end thereof. The shaft 37 has secured thereto at its upper end a disk 38 having opposed arms 39—39. A link 40 is provided for each arm 39 and is pivoted at its upper end thereto. The links 40 are respectively pivoted at their lower ends to the upper ends of the corresponding links 36—36, weights 41—41 being provided at the junction of the links 40—40 and 36—36. Each of the links 36—36 is provided with a lateral extension 42 at its lower end carrying a roller arranged to bear upon a thrust washer or ring 44 that is slidably disposed on the enlarged portion 19 of the hollow shaft 18 and is urged upwardly by a spring 45 that is disposed between the washer or ring 44 and an adjusting nut 46 that is screwed on the exteriorly threaded lower portion of the enlarged portion 19.

A canopy 47 is arranged to cover the parts described as positioned above the plane of the cover plate 10. The canopy 47 has a reduced interiorly threaded portion 48 adapted to screw on the exteriorly threaded flange 49 that is integral with the cover plate 10 as best seen in Fig. 1. A pin 50 depends into an axial bore 51 of the shaft 37 through an opening in the canopy 47 until the head 52 rests upon the canopy. A ball race member 53 is maintained in a socket 54 in the lower end of the boss 15 by jam or lock nuts 55. The ball race member 53 and the contiguous wall of the boss 15 are formed with cooperating annular grooves in which work balls 56 so that the hollow shaft 18 turns anti-frictionally with respect to the boss 15. A cap 57 has a threaded connection at 58 with the boss 15 and the lower end of the hollow shaft 18 rests upon the inner wall of the cap while the shaft 37 depends through an opening 59 through its wall. The shaft 37 carries agitators 60 at its lower end. An intake conduit or tube 61 is passed upwardly through the exhaust pipe 3 and is threaded at its upper end into an opening 62 that communicates with an intake groove 63 in the upper surface of the enlargement 7 to the wall 6 of the casing. The groove 63 is reduced toward its end communicating with the arcuate portion of the chamber 8. A plate 64 is secured in position by any suitable means, none being shown, to cover the groove 63, whereby a fluid passing into the latter is discharged at 65 into the chamber 8. A valve of any suitable construction is disposed within the intake tube 61 and is provided with a stem 66 passing laterally through the tube 61 and the exhaust pipe 3. A valve handle 67 is pivoted at 68 to a link 69 that is pivoted at 70 to an arm 71. The latter is rigidly secured to a rock shaft 72 journalled in hangers 73 secured by screws 74 or the like to the under surface of the top of the hollow base 1. A rocker arm 75 secured to the rock shaft 72 carries at its outer end a stand or holder 76 having a stem 77 secured to the arm 75 to extend upwardly through an aperture 78 in the top of the hollow base 1.

From the foregoing description of the various parts of the device, the operation thereof may be readily understood. A receptacle 79 containing the drink to be mixed is placed upon the holder 76 and the weight thereof forces the rocker arm downwardly, thereby moving the valve handle 67 into the position indicated by the dotted lines in Fig. 3 so that a power fluid, such as water from any convenient source of supply, may pass upwardly through the intake tube 61 and along the groove 63 to impinge against the blades of the water wheel, thereby imparting a rotary movement to the latter. The sleeve 17 being integral with the rotor is rotated and imparts a like movement to the hollow shaft 18, whereby the shaft 37 is rotated. When the speed of rotation of the hollow shaft 18 reaches a predetermined speed, the weights 41 will fly outwardly, thereby slidably moving the shaft 37 downwardly until the agitators 60 are submerged in the contents of the receptacle. Since the shaft 37 is rotated simultaneously, the contents of the receptacle will be thoroughly and effectively mixed. The tension on the spring 45 may be adjusted instantly at will by turning the adjusting nut 46 so that the speed at which the shaft 37 will be slidably moved may be varied at will. Removal of the receptacle permits the valve handle to assume by gravity the position indicated by the full lines in Fig. 3, whereby the passage of water through the intake tube 61 is prevented. Water or other power fluid passing upwardly between the contiguous walls of the hollow shaft 18 and the sleeve 17 may pass through passages 80 into the reservoir 81 defined by the flange 49 and thence through a passage 82 to the exhaust pipe 3.

The device is simple in construction and practically automatic in its action, thereby providing a means for occasioning the mixing of a drink in the minimum of time and with a minimum of attention.

I claim:

1. A drink mixer comprising a vertical shaft carrying agitators at its lower end, means for supporting the shaft for rotative and slidable movement, said shaft supporting means including centrifugal members, a motor operatively connected with the centrifugal members and arranged to drive the shaft, tensional means for controlling the operation of the centrifugal means, whereby the shaft is slidably moved when the centrifugal members are driven at a certain speed, and means for adjusting the tensional means to vary at will the speed at which the shaft will be slidably moved.

2. In a drink mixing device, a base, a casing, means for supporting the casing above the base, a vertical shaft arranged to extend through the casing and provided with agitators at its lower end, a water wheel disposed within the casing and arranged to drive the shaft, an intake conduit for supplying a motive fluid to the wheel, a holder for a drink holding receptacle, a valve for controlling the flow of the motive fluid through the intake conduit and means connecting the receptacle holder and the valve for movably supporting the receptacle holder in a desired position with respect to the lower end of the shaft and for operating the valve.

3. In a drink mixing device, a base, a casing, means for supporting the casing above the base, a vertical shaft arranged to extend through the casing and provided with agitators at its lower end, a water wheel disposed within the casing and arranged to drive the shaft, an intake conduit for supplying a motive fluid to the wheel, a holder for a drink holding receptacle, a valve for controlling the flow of the motive fluid through the intake conduit, and means connecting the receptacle holder and the valve for movably supporting the receptacle holder in a desired position with respect to the lower end of the shaft and for operating the valve, said last named means being arranged to be normally actuated by gravity to move the valve into closed position and to maintain the receptacle holder in a relatively elevated position, whereby the valve is moved into open position when the receptacle holder is moved downwardly.

4. In a drink mixing device, a hollow base, a water motor supported above the base, a shaft arranged to be driven by the water motor and to be positioned with one end thereof adjacent to the base, an intake conduit for supplying a motive fluid to the water motor, a valve disposed in the intake conduit, a rock shaft carried by the base, links connecting the rock shaft and the valve, a rocker arm secured to the rock shaft, a stand carried by said rocker arm and adapted to support a drink holding receptacle, said links being adapted to balance the weight of said rocker arm and said stand, whereby said valve is maintained in closed position and the stand is maintained in a relatively elevated position when no stress is placed on the latter.

CHARLES VOGT.